United States Patent
Nigon et al.

(10) Patent No.: US 12,543,641 B2
(45) Date of Patent: Feb. 10, 2026

(54) DRAPER HEADER WITH LEAN BAR ASSEMBLY

(71) Applicant: MACDON INDUSTRIES LTD., Winnipeg (CA)

(72) Inventors: Cyrus Nigon, Lake Mills, WI (US); Nicholas Friberg, Madison, WI (US); Bruce Shearer, Winnipeg (CA)

(73) Assignee: MACDON INDUSTRIES LTD., Winnipeg (CA)

( * ) Notice: Subject to any disclaimer, the term of this patent is extended or adjusted under 35 U.S.C. 154(b) by 485 days.

(21) Appl. No.: 18/016,447

(22) PCT Filed: Jul. 20, 2020

(86) PCT No.: PCT/US2020/070274
§ 371 (c)(1),
(2) Date: Jan. 16, 2023

(87) PCT Pub. No.: WO2022/015360
PCT Pub. Date: Jan. 20, 2022

(65) Prior Publication Data
US 2023/0292662 A1  Sep. 21, 2023

(51) Int. Cl.
*A01D 41/06* (2006.01)
*A01D 57/01* (2006.01)
*A01D 57/04* (2006.01)

(52) U.S. Cl.
CPC .............. *A01D 41/06* (2013.01); *A01D 57/01* (2013.01); *A01D 57/04* (2013.01)

(58) Field of Classification Search
CPC ......... A01D 41/06; A01D 57/01; A01D 57/04
See application file for complete search history.

(56) References Cited

U.S. PATENT DOCUMENTS

| 3,474,601 A | 10/1969 | Burrough et al. |
| 3,733,796 A | 5/1973 | Wood et al. |
| 3,835,629 A | 9/1974 | Rosendahl et al. |
| 4,008,558 A | 2/1977 | Mott |

(Continued)

FOREIGN PATENT DOCUMENTS

| CA | 2320524 | 3/2002 | |
| WO | 2017208150 | 12/2017 | |
| WO | WO-2019140512 A1 * | 7/2019 | ........... A01D 75/182 |

*Primary Examiner* — Nicole Coy
(74) *Attorney, Agent, or Firm* — Miller, Canfield, Paddock and Stone

(57) ABSTRACT

A draper header for harvesting agricultural crops includes at least one lean bar assembly for engaging the crops to be harvested prior to a first and a second crop pick-up reel. The first crop pick-up reel is rotatably coupled between an outboard and a center reel support arm of the draper header, and the second crop pick-up reel is rotatably coupled between the center and an outboard reel support arm of the draper header. The first and second crop pick-up reels are selectively moveable in a fore and an aft direction along the inboard, outboard, and center reel support arms for engaging the crops to be harvested. The lean bar assemblies are secured to each of the first and second crop pick-up reels at a predetermined position relative thereto and maintain the predetermined position during selective movement of the first and second crop pick-up reels in the fore and aft directions.

34 Claims, 10 Drawing Sheets

(56) References Cited

U.S. PATENT DOCUMENTS

| | | |
|---|---|---|
| 4,821,494 A | 4/1989 | O'Halloran et al. |
| 4,951,451 A | 8/1990 | Klinner |
| 2006/0242935 A1 | 11/2006 | Rayfield et al. |
| 2008/0161077 A1 | 7/2008 | Honey |
| 2012/0011819 A1 | 1/2012 | Olander et al. |
| 2012/0011821 A1 | 1/2012 | Olander et al. |
| 2013/0160414 A1 | 6/2013 | Robert et al. |
| 2019/0104682 A1 | 4/2019 | Mossman |
| 2020/0214208 A1 | 7/2020 | Shearer |

\* cited by examiner

DRAPER HEADER WITH LEAN BAR ASSEMBLY

BACKGROUND OF THE INVENTION

1. Field of the Invention

The present invention relates to a draper header for harvesting agricultural crops.

2. Description of Related Art

Draper headers for harvesting agricultural crops are known in the art. Typical draper headers include a header frame having a front and a rear portion extending laterally between opposite first and second ends. A first and a second reel support arm are disposed adjacent the first and second ends of the header frame, where each of the first and second reel support arms extend between a proximal end coupled to the rear portion of the header frame and an opposite distal end spaced above the front portion of the header frame. Typically, a crop pick-up reel is rotatably coupled between the first and second reel support arms for engaging the crops to be harvested, and the crop pick-up reel is often selectively moveable in a fore and an aft direction along the reel support arms between the proximal and distal ends thereof. Often a lean bar assembly is attached to the header frame for engaging the crops to be harvested prior to the crop pick-up reel. However, typical draper headers known in the art generally do not maintain a pre-determined position of the lean bar assembly relative the crop pick-up reel during movement of the crop pick-up reel in the fore and aft directions along the reel support arms. Therefore, lean bar assemblies known in the art often require adjustment as the crop pick-up reel is moved throughout its range.

SUMMARY OF THE INVENTION

According to one aspect of the invention, a draper header is provided for harvesting agricultural crops. The draper header includes a header frame with a front and a rear portion extending laterally between opposite first and second ends. A first and a second reel support arm are disposed adjacent the first and second ends of the header frame, where each of the first and second reel support arms extend between a proximal end coupled to the rear portion of the header frame and an opposite distal end spaced above the front portion of the header frame. A crop pick-up reel is rotatably coupled between the first and second reel support arms for engaging the crops to be harvested and is selectively moveable in a fore and an aft direction along the reel support arms between the proximal and distal ends thereof. A lean bar assembly is coupled to the crop pick-up reel for engaging the crops to be harvested prior to the crop pick-up reel, wherein the lean bar assembly is secured at a predetermined position relative to the crop pick-up reel to maintain the predetermined position during selective movement of the crop pick-up reel in the fore and aft directions along the reel support arms.

According to another aspect of the invention, a draper header is provided for harvesting agricultural crops. The draper header includes a header frame with a front and a rear portion extending laterally between opposite first and second ends. An inboard and an outboard reel support arm are disposed adjacent the first and second ends of the header frame, and a center reel support arm is spaced therebetween. Each of the inboard, outboard, and center reel support arms extend between a proximal end coupled to the rear portion of the header frame and an opposite distal end spaced above the front portion of the header frame. A first crop pick-up reel is rotatably coupled between the outboard and center reel support arms and a second crop pick-up reel is rotatably coupled between the inboard and center reel support arms for engaging the crops to be harvested. The first and second crop pick-up reels are selectively moveable in a fore and an aft direction along the inboard, outboard, and center reel support arms between the proximal and distal ends thereof. A lean bar assembly is coupled to each of the first and second crop pick-up reels for engaging the crops to be harvested prior to the first and second crop pick-up reels. At least one of the lean bar assemblies is secured at a predetermined position relative to the first and second crop pick-up reels to maintain the predetermined position during selective movement of the first and second crop pick-up reels in the fore and aft directions along the inboard, outboard, and center reel support arms.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
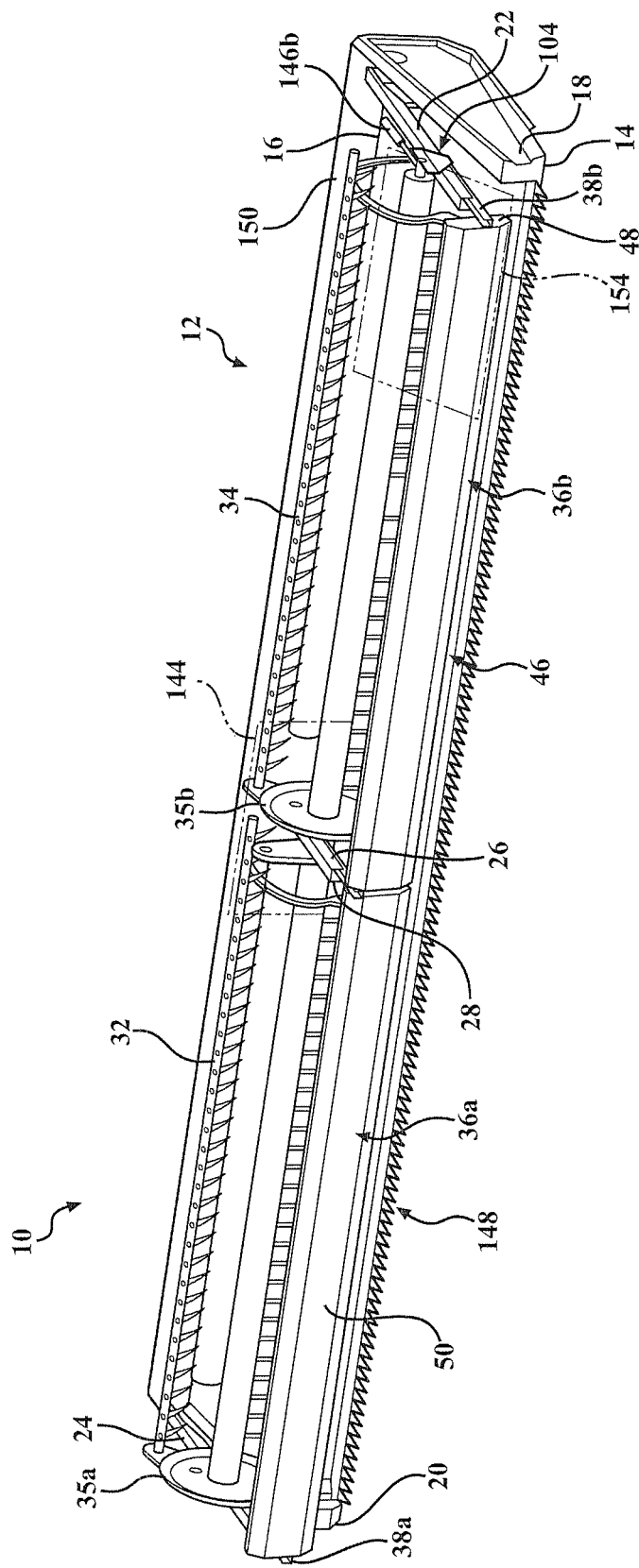
FIG. 1 is a perspective view of a draper header according to a primary embodiment of the present invention.
Figure 2:
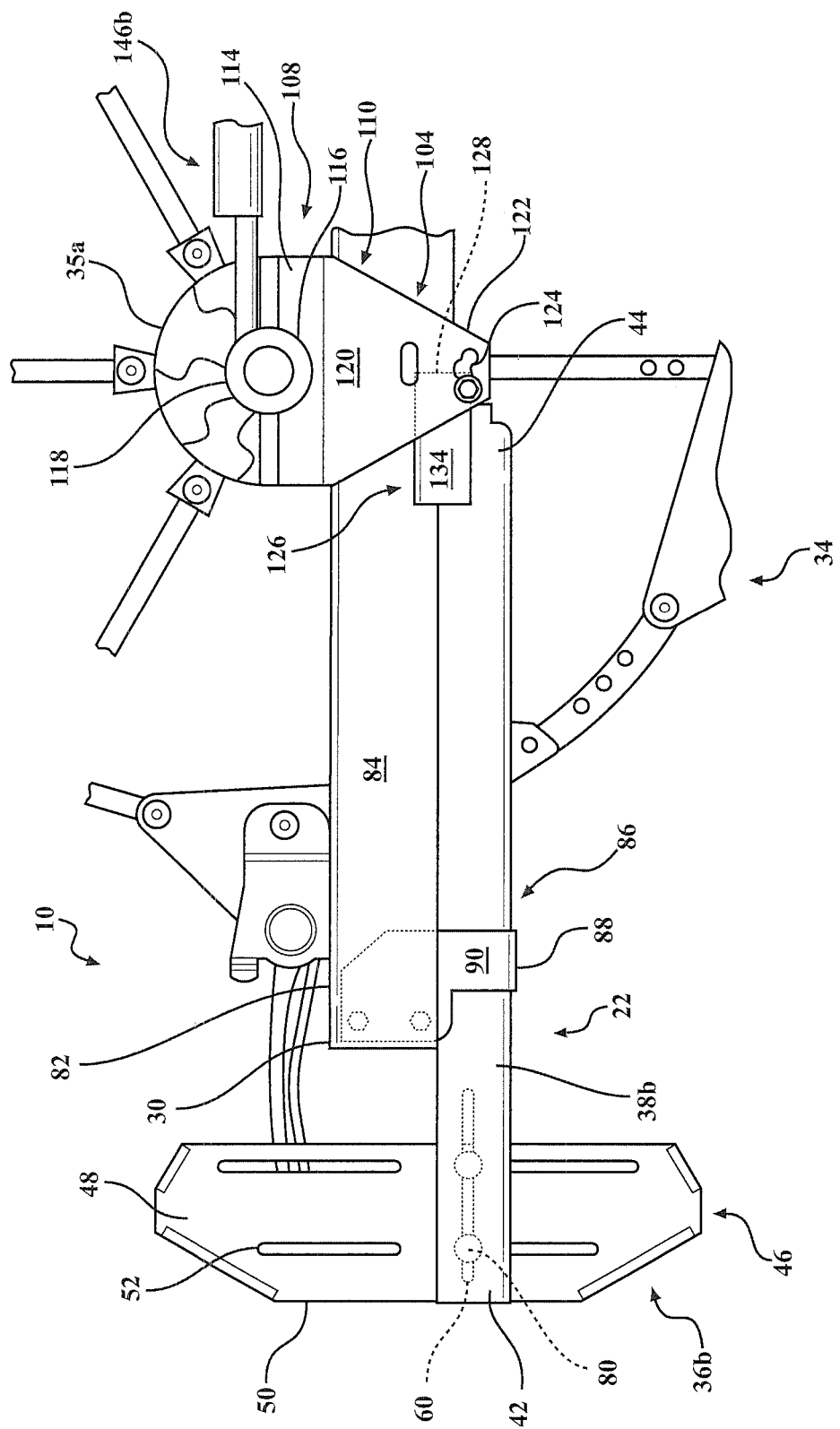
FIG. 2 is a fragmentary side view of the draper header of FIG. 1.
Figure 3:
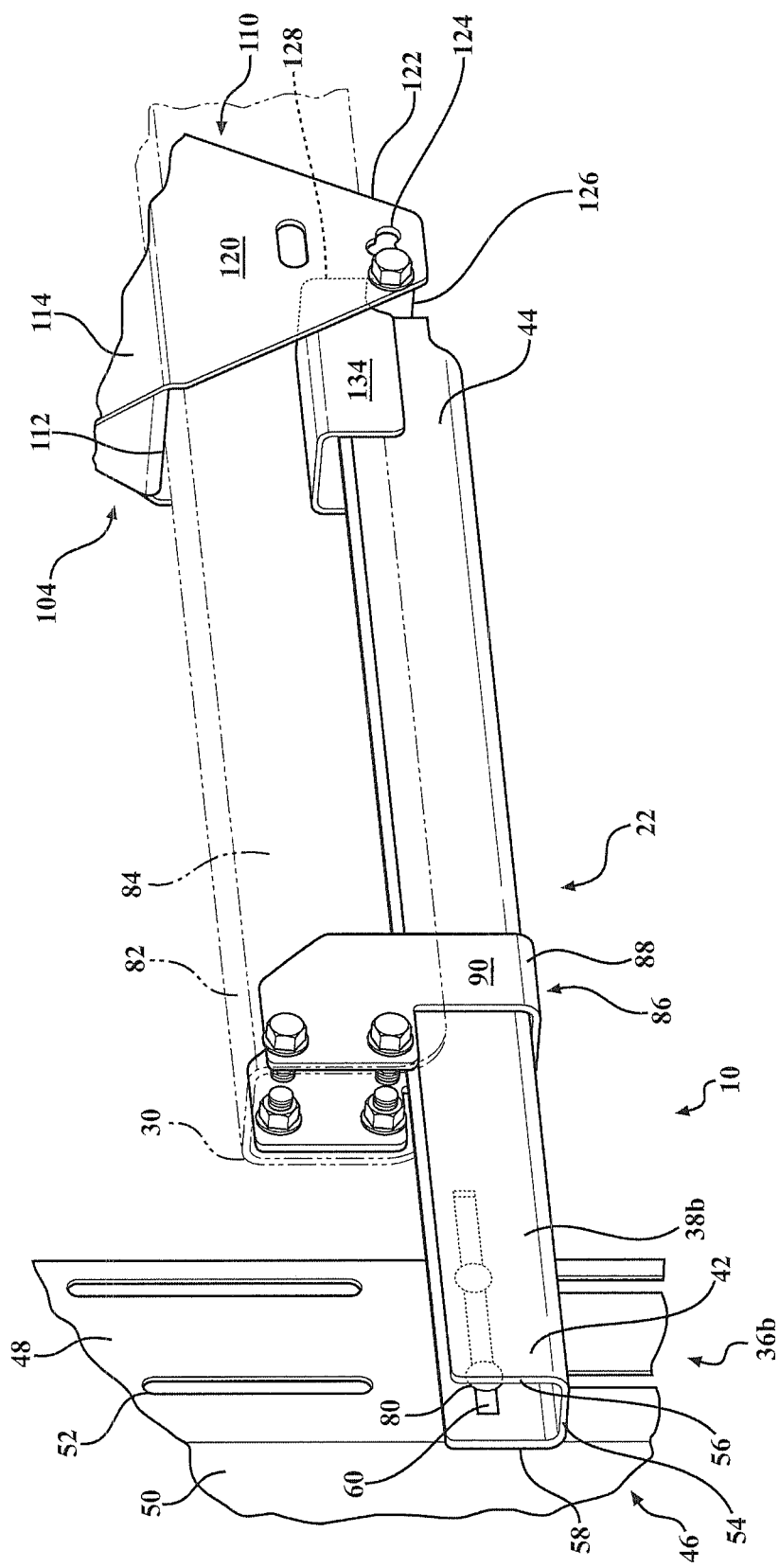
FIG. 3 is an fragmentary perspective view of the draper header of FIG. 1 showing a second lean bar assembly coupled to a lateral reel bracket.
Figure 12:
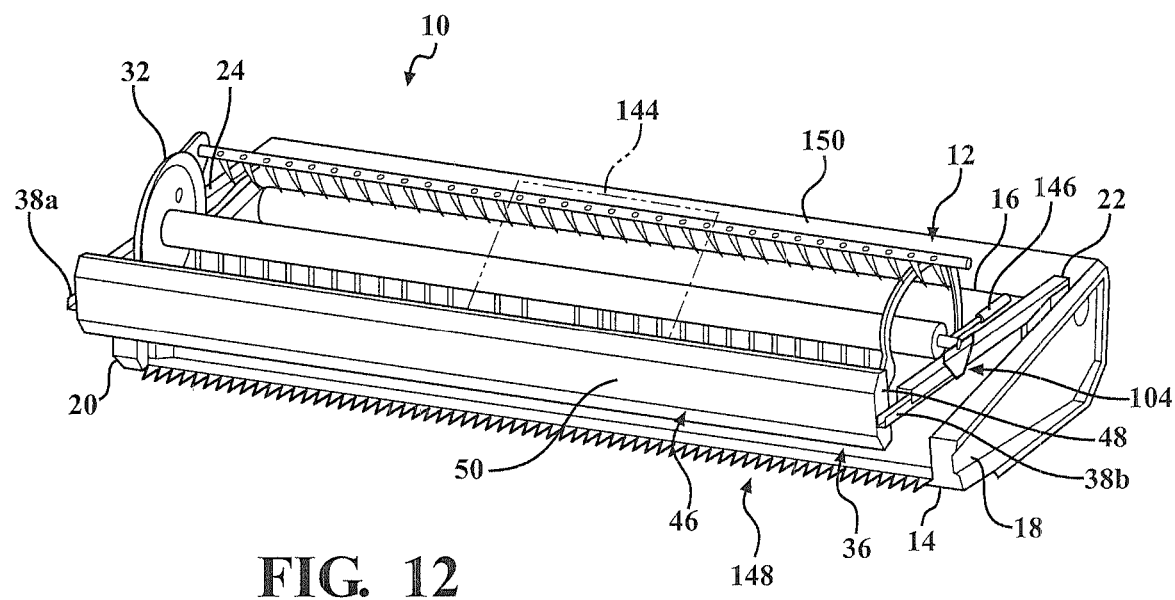
FIG. 12 is a perspective view of a draper header according to an alternative embodiment of the present invention.

Referring to the Figures, wherein like numerals indicate like or corresponding parts throughout the several views, a draper header for harvesting agricultural crops is shown generally at 10. The draper header 10 includes a header frame 12 with a front portion 14 and a rear portion 16 extending laterally between opposite first and second ends 18, 20. An inboard reel support arm 22 and an outboard reel support arm 24 are disposed adjacent the first and second ends 18, 20 of the header frame 12 with a center reel support arm 26 spaced generally equally therebetween. The inboard, outboard, and center reel support arms 22, 24, 26 each extend between a proximal end 28 coupled to the rear portion 16 of the header frame 12 and an opposite distal end 30 spaced above the front portion 14 of the header frame 12, as shown in FIGS. 1 through 3. Additionally, although only the inboard reel support arm is shown in FIGS. 2 and 3, it is appreciated that the inboard and outboard reel support arms are substantially the same. A first crop pick-up reel 32 is slidably and rotatably coupled between the outboard and center reel support arms 24, 26 and a second crop pick-up reel 34 is slidably and rotatably coupled between the inboard and center reel support arms 22, 26 for engaging the crops to be harvested. The first and second crop pick-up reels 32, 34 each extend between a lateral and a medial end 35a, 35b and are selectively moveable in a fore and an aft direction along the inboard, outboard, and center reel support arms 22, 24, 26. Referring to FIGS. 1 and 2, a first lean bar assembly 36a is releasably coupled to the first crop pick-up reel 32 and a second lean bar assembly 36b is releasably coupled to the second crop pick-up reel 34. The first and second lean bar assemblies 36a, 36b engage and forwardly lean the crops to be harvested prior to entering the first and second crop pick-up reels 32, 34 to prevent tangling of the crops therein. It is to be appreciated that the draper header may include any suitable number and arrangement of reel support arms, crop pick-up reels, and lean bar assemblies without varying the scope of the invention. For example, the draper header may include a single crop pick-up reel and a corresponding lean bar assembly, as shown in FIG. 12, wherein the crop pick-up reel and lean bar assembly are slidably and rotatably supported between a pair of reel support arms.

Referring to FIGS. 1 through 3, the first lean bar assembly 36a includes a pair of spaced apart lateral and medial lean bar supports 38a, 40a, and the second lean bar assembly similarly includes a pair of spaced apart lateral and medial lean bar supports 38b, 40b. Each of the lateral and medial lean bar supports 38a, 38b, 40a, 40b extend longitudinally between a first end 42 and an opposite second end 44. The first and second lean bar assemblies 36a, 36b also include a crop engagement element 46 extending laterally between the first ends 42 of each respective pair of lateral and medial lean bar supports 38a, 38b, 40a, 40b. The crop engagement elements 46 have a pair of lateral side walls 48 and a substantially arcuate forward wall 50 extending therebetween for engaging the crops to be harvested, as shown in FIGS. 1 and 2. Referring to FIG. 2, the lateral side walls 48 of each crop engagement element 46 have a plurality of vertically extending slots 52 for adjustably coupling to the lateral and medial lean bar supports 38a, 38b, 40a, 40b as is described in further detail in the paragraphs below. It is to be appreciated that the crop engagement elements of each lean bar assembly may take any suitable shape or arrangement to engage the crops to be harvested without limiting the scope of the invention. Referring to FIG. 1, the second ends 44 of the lateral and medial lean bar supports 38a, 40a of the first lean bar assembly 36a are releasably coupled to the first crop pick-up reel 32, and the second ends 44 of the lateral and medial lean bar supports 38b, 40b of the second lean bar assembly 36b are releasably coupled to the second crop pick-up reel 34. The first and second lean bar assemblies 36a, 36b are therefore secured at a predetermined position relative to the first and second crop pick-up reels 32, 34 and maintain the predetermined position during selective movement of the first and second crop pick-up reels 32, 34 in the fore and the aft directions along the inboard, outboard, and center reel support arms 22, 24, 26.

Figure 4:
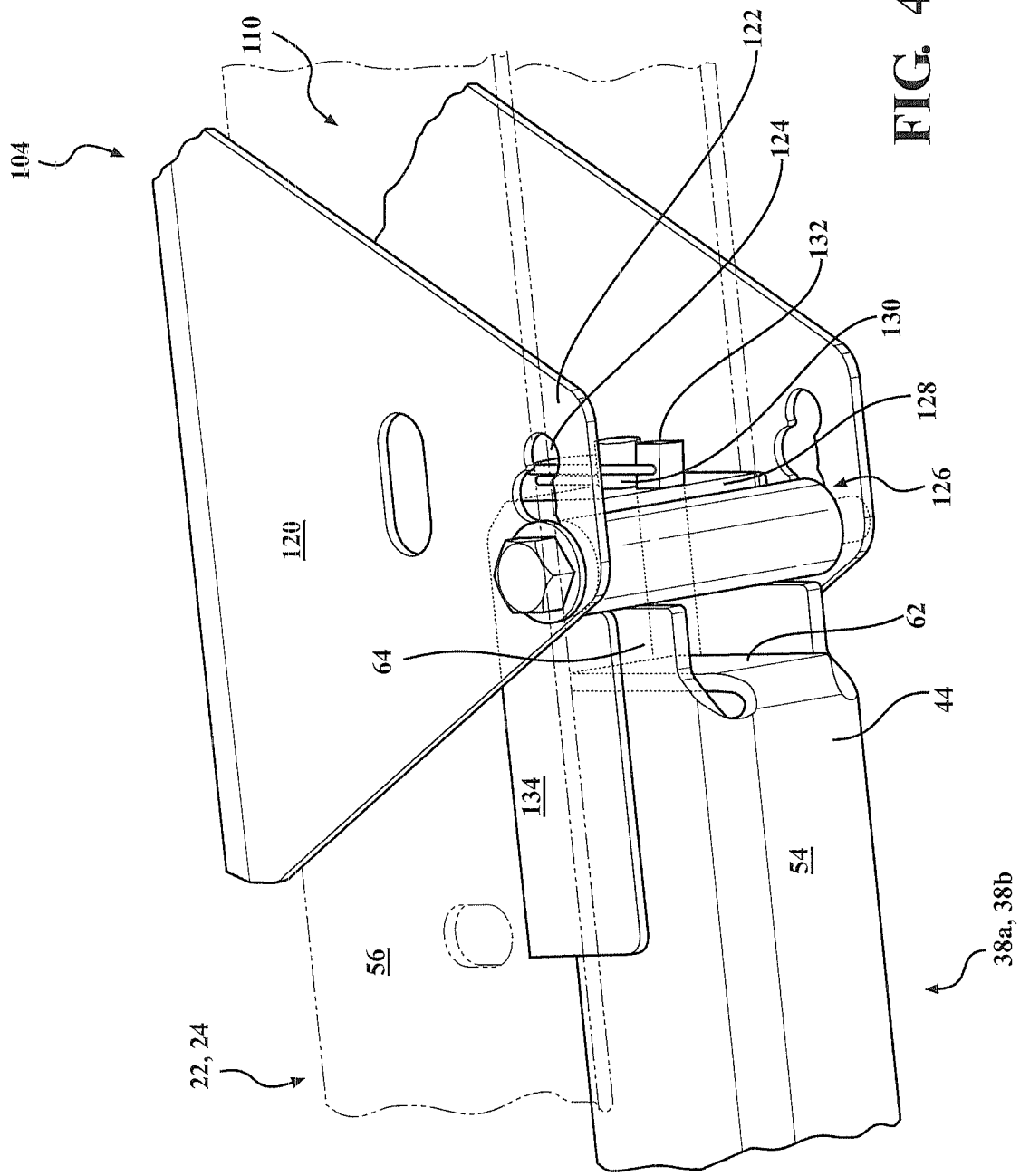
FIG. 4 is an enlarged fragmentary perspective view of the draper header of FIG. 1 showing the second lean bar assembly further secured to the lateral reel bracket.

Referring to FIG. 3, the lateral lean bar supports 38a, 38b each have a generally U-shaped cross-section defined by a horizontal bottom side 54 extending laterally between an upwardly-extending outer side wall 56 and an upwardly-extending inner side wall 58. A longitudinally extending slot 60 is disposed on the inner side walls 58 of each lateral lean bar support 38a, 38b adjacent the first ends 42 thereof for adjustably coupling to the respective crop engagement elements 46. Referring to FIG. 4, a tab 62 extends upwardly from the bottom sides 54 of each lateral lean bar support 38a, 38b at the second ends 44 thereof. A post 64 further extends longitudinally from each tab 62 for releasably coupling the lateral lean bar supports 38a, 38b to the respective first and second crop pick-up reels 32, 34.

Figure 5:
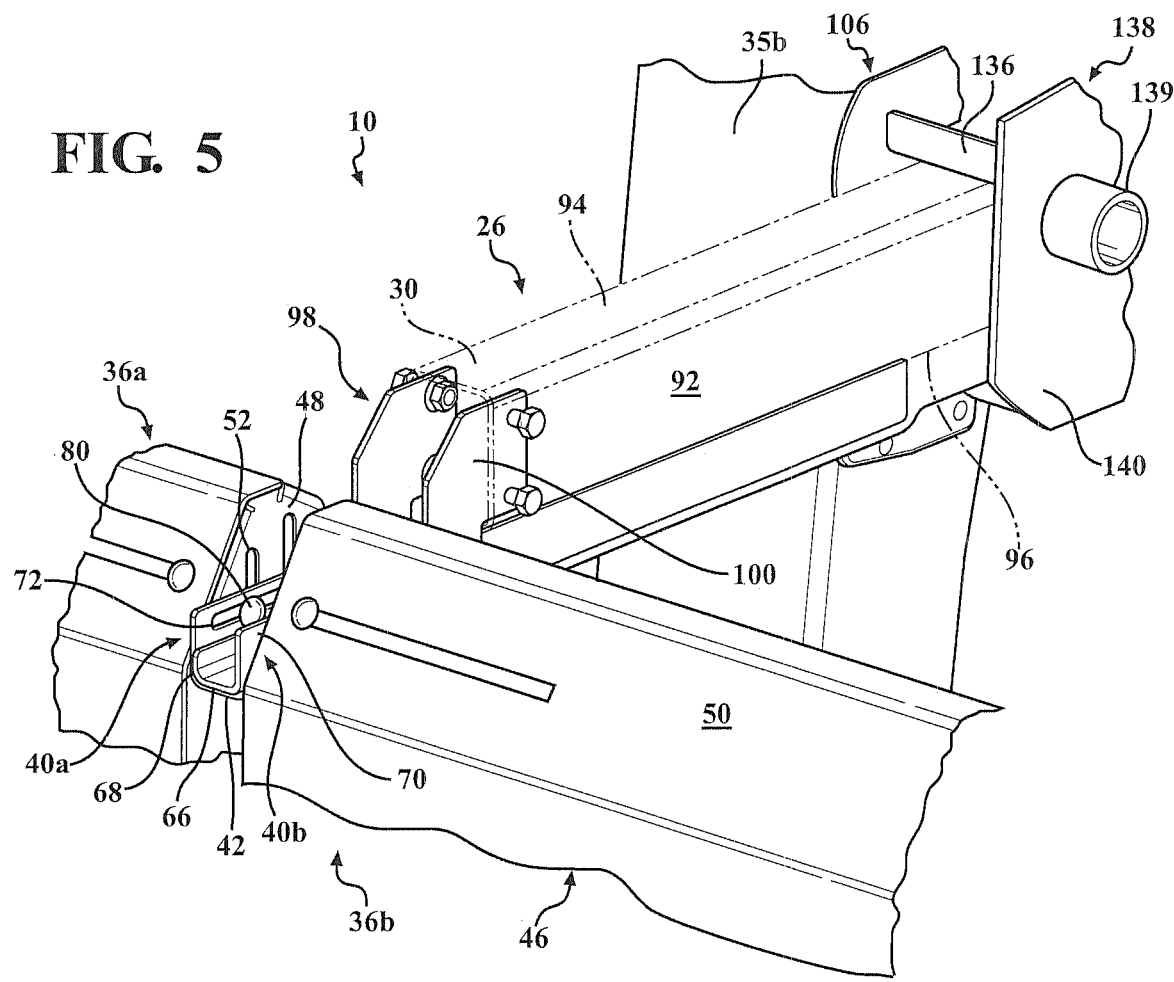
FIG. 5 is a fragmentary perspective view of the draper header of FIG. 1 showing a center reel support arm with a center cradle slidably supporting a first lean bar assembly and the second lean bar assembly.
Figure 6:
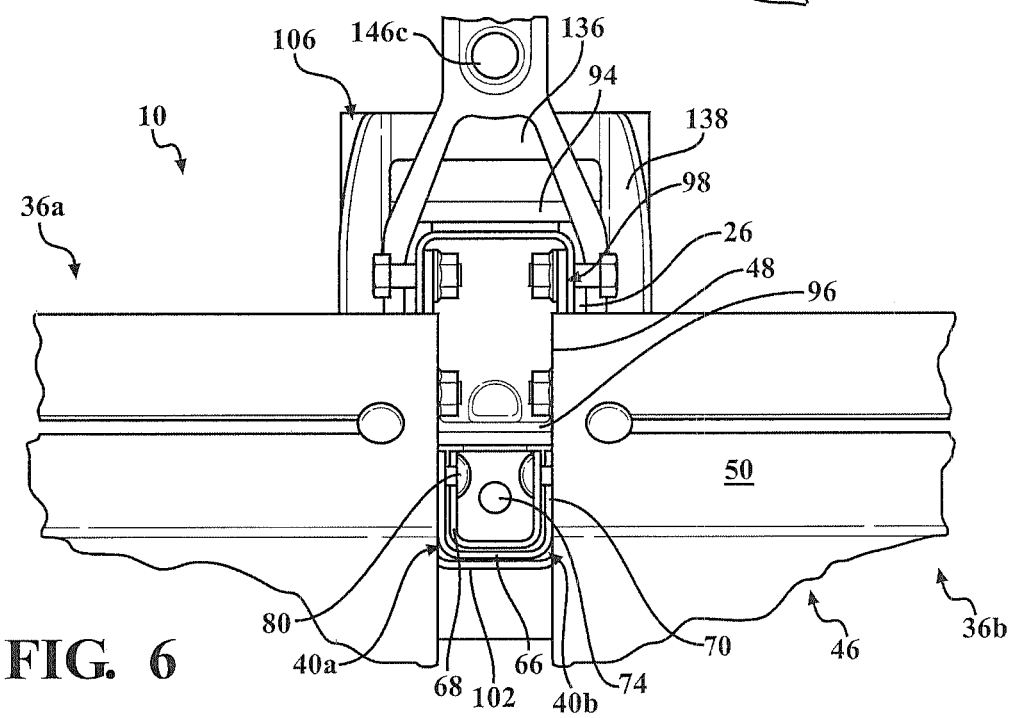
FIG. 6 is a fragmentary front view of the draper header of FIG. 1 showing a medial lean bar support of the first lean bar assembly slidably and matingly coupled with a medial lean bar support of the second lean bar assembly.
Figure 7:
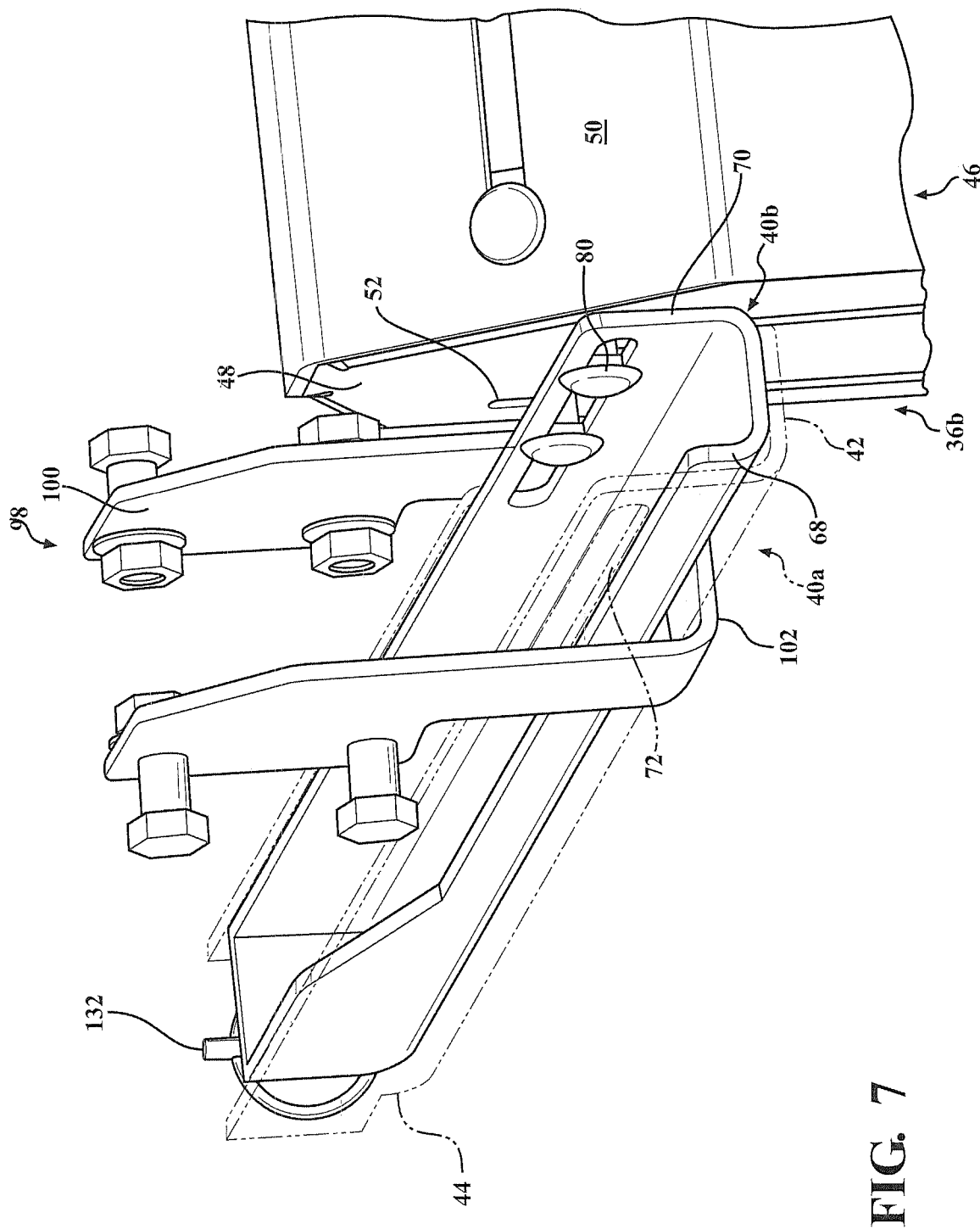
FIG. 7 is a fragmentary perspective view of the draper header of FIG. 1 further showing the medial lean bar support of the first lean bar assembly slidably and matingly coupled with the medial lean bar support of the second lean bar assembly.
Figure 8:
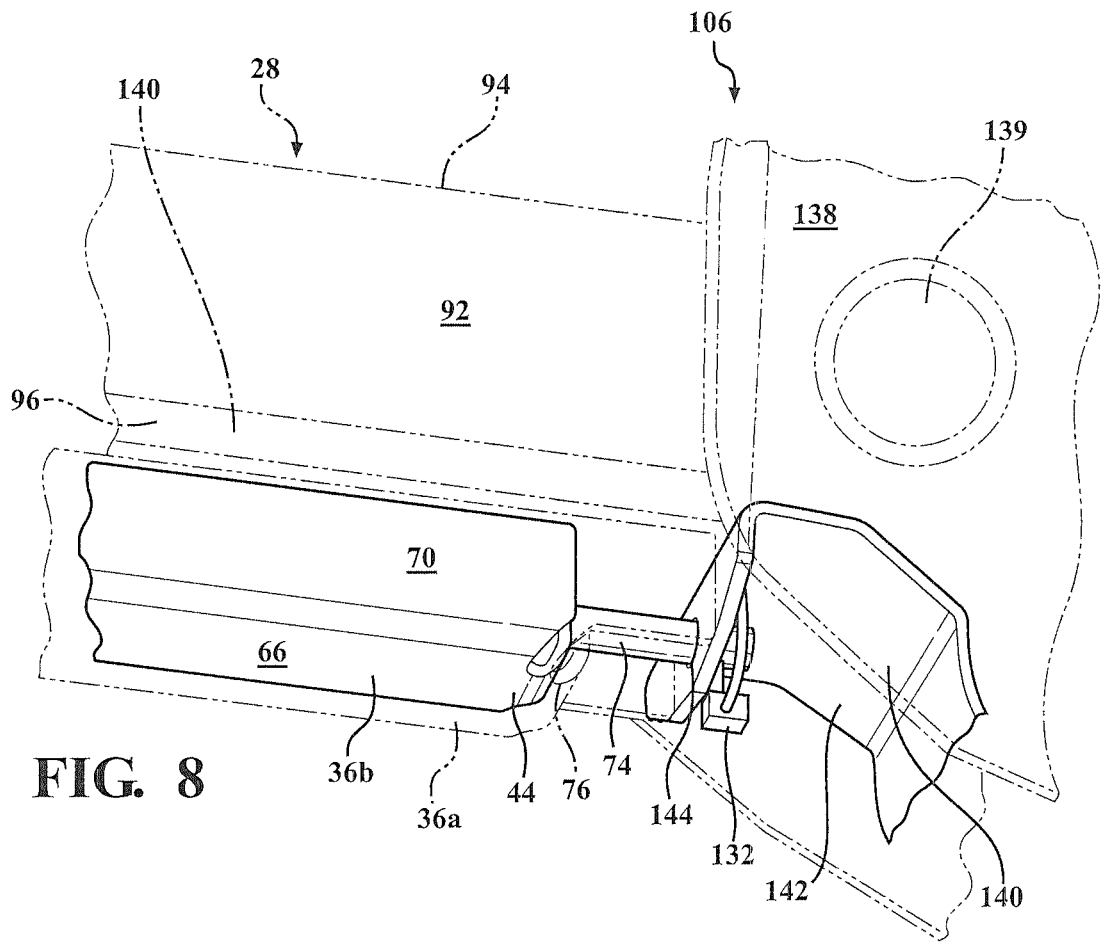
FIG. 8 is an enlarged fragmentary perspective view of the draper header of FIG. 1 showing the first and second lean bar assemblies secured to a center reel bracket.
Figure 9:
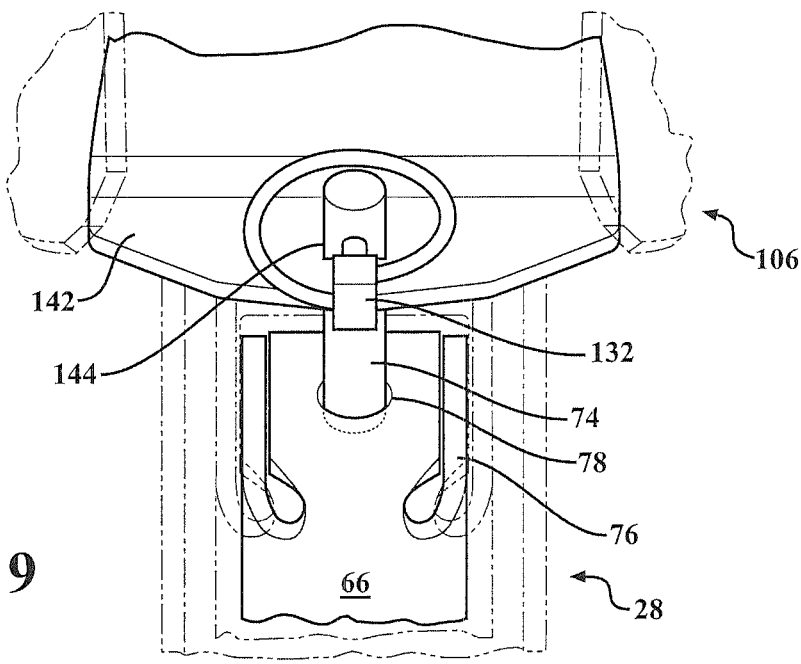
FIG. 9 is an enlarged fragmentary perspective view of the draper header of FIG. 1 further showing the first and second lean bar assemblies secured to the center reel bracket.

Referring to FIGS. 5 and 6, the medial lean bar support 40b of the second lean bar assembly 36b is slidably and matingly coupled within the medial lean bar support 40a of the first lean bar assembly 36a for reducing space therebetween and facilitating easy removal of the first and second lean bar assemblies 36a, 36b from the draper header 10. However, it is to be appreciated that the medial lean bar supports may couple in any suitable arrangement, or may omit coupling entirely, without varying the scope of the invention. The medial lean bar supports 40a, 40b each have a generally J-shaped cross-section mirrored relative to one another at the first ends 42 thereof, as shown in FIG. 6. The generally J-shaped cross-sections are defined by a horizontal bottom side 66 extending between an upwardly-extending shortened side wall 68 and an upwardly-extending full side wall 70. Additionally, the generally J-shaped cross-section of each medial lean bar support 40a, 40b extends to a full U-shaped cross-section adjacent the second ends 44 thereof for added robustness and stability, as shown in FIG. 7. A longitudinally extending slot 72 is further disposed on the full side wall 70 of each medial lean bar support 40a, 40b adjacent the first ends 42 thereof for adjustably coupling to the respective crop engagement elements 46. Referring to FIGS. 8 and 9, a post 74 extends longitudinally from the second end 44 of the medial lean bar support 40b of the second lean bar assembly 36b. The medial lean bar support 40a of the first lean bar assembly 36a has a tab 76 extending upwardly from the bottom side 66 at the second end 44 thereof. A corresponding opening 78 in the tab 76 receives the post 74 to releasably couple the medial lean bar supports 40a, 40b to the first and second crop pick-up reels 32, 34.

Referring to FIGS. 3, 5, and 6, a plurality of coupling pins 80 extend between the vertically extending slots 52 on the lateral side walls 48 and the longitudinally extending slots 60, 72 on the lateral and medial lean bar supports 38a, 38b, 40a, 40b for adjustably coupling the crop engagement elements 46 therebetween. The predetermined position of the first and second lean bar assemblies 36a, 36b relative to the first and second crop pick-up reels 32, 34 is therefore adjustable and selectable by manipulating each crop engagement element 46 in the fore and aft directions along the longitudinally extending slots 60, 72 of each respective pair of lateral and medial lean bar supports 38a, 38b, 40a, 40b.

Referring to FIGS. 2 and 3, the inboard and outboard reel support arms 22, 24 have a generally U-shaped cross-section inverted relative to the header frame 12 that is defined by a horizontal top side 82 extending between a pair of downwardly-extending lateral side walls 84. A lateral cradle 86 is coupled to each of the inboard and outboard reel support arms 22, 24 adjacent the distal ends 30 thereof, as shown in FIG. 3. Each lateral cradle 86 has a generally U-shaped cross-section defined by a horizontal bottom side 88 extending laterally between a pair of upwardly-extending lateral side walls 90. The lateral side walls 90 matingly couple within and are secured to the lateral side walls 84 of the inboard and outboard reel support arms 22, 24 such that the bottom sides 88 of the lateral cradles 86 are suspended below the inboard and outboard reel support arms 22, 24, as shown in FIGS. 2 and 3. However, it is to be appreciated that the inboard and outboard reel support arms and the lateral cradles may have any number of potential arrangements and shapes without varying the scope of the invention. The lateral cradle 86 attached to the outboard reel support arm 24 slidably receives and supports the lateral lean bar support 38a of the first lean bar assembly 36a therethrough during selective movement of the first and second crop pick-up reels 32, 34 in the fore and aft directions. Similarly, the lateral cradle 86 attached to the inboard reel support arm 22 slidably receives and supports the lateral lean bar support 38b of the second lean bar assembly 36b during selective movement of the first and second crop pick-up reels 32, 34 in the fore and aft directions.

Referring to FIGS. 5 through 7, the center reel support arm 26 has opposite lateral side walls 92 extending between a horizontal top side 94 and a horizontal bottom side 96. A center cradle 98 is coupled to the center reel support arm 26 at the distal end 30 thereof, as shown in FIG. 5. The center cradle 98 has a pair of lateral side walls 100 affixed to and extending outwardly and downwardly from the lateral side walls 92 of the center reel support arm 26 to a horizontal bottom side 102, as shown in FIGS. 6 and 7. However, it is to be appreciated that the center reel support arm and the center cradle may have any number of potential arrangements and shapes without varying the scope of the invention. The center cradle 98 slidably receives and supports the medial lean bar supports 40a, 40b of the first and second the lean bar assemblies 36a, 36b therethrough during selective movement of the first and second crop pick-up reels 32, 34 in the fore and aft directions.

A lateral reel bracket 104 is slidably attached to each inboard and outboard reel support arm 22, 24, as shown in FIGS. 1 and 2, and a center reel bracket 106 is slidably attached to the center reel support arm 26, as shown in FIGS. 1 and 5. The first crop pick-up reel 32 is rotatably and slidably supported between the center reel bracket 106 and the lateral reel bracket 104 attached to the outboard reel support arm 24. Similarly, the second crop pick-up reel 34 is rotatably and slidably supported between the center reel bracket 106 and the lateral reel bracket 104 attached to the inboard reel support arm 22. The lateral and center reel brackets 104, 106 additionally couple with the first and second lean bar assemblies 36a, 36b for corresponding slideable movement of the first and second lean bar assemblies 36a, 36b with the first and second crop pick-up reels 32, 34.

Referring to FIGS. 2 through 4, each lateral reel bracket 104 extends between an upper portion 108 and a lower portion 110 with a substantially planar engagement surface 112 disposed therebetween. The upper portion 108 of each lateral reel bracket 104 includes a pair of walls 114 extending upwardly from the engagement surface 112, the walls 114 forming a semiannular recess 116 for cradling an annular coupling element 118. The annular coupling elements 118 rotatably couple to the lateral ends 35a of the first and second crop pick-up reels 32, 34, as shown in FIG. 2. The lower portion 110 of each lateral reel bracket 104 includes a pair of laterally spaced apart legs 120 extending downwardly from the engagement surface 112, as shown in FIGS. 2 through 4. The engagement surface 112 of each lateral reel bracket 104 slidably engages the horizontal top sides 82 of the inboard and outboard reel support arms 22, 24, and the legs 120 straddle the lateral side walls 84 of the inboard and outboard reel support arms 22, 24 for slideable movement of the lateral reel brackets 104 along the inboard and outboard reel support arms 22, 24.

The legs 120 of each lateral reel bracket 104 extend downwardly past the lateral side walls 84 of the inboard and outboard reel support arms 22, 24 and terminate at a lower end 122, as shown in FIGS. 3 and 4. A bracket hole 124 is correspondingly disposed on each leg 120 adjacent the lower ends 122 thereof. A mounting bracket 126, as shown in FIG. 4, extends between and is fixedly secured to the corresponding bracket holes 124. Each mounting bracket 126 has a substantially planar rear wall 128 extending substantially vertically from the corresponding bracket holes 124 and laterally between the legs 120 with an opening 130 therethrough. The openings 130 in the mounting brackets 126 each receive one of the posts 64 extending from the lateral lean bar supports 38a, 38b to releasably couple the lateral lean bar support 38a of the first lean bar assembly 36a to the first crop pick-up reel 32, and to releasably couple the lateral lean bar support 38b of the second lean bar assembly 36b to the second crop pick-up reel 34. Each mounting bracket 126 further includes an alignment element 134 extending transversely from the rear wall 128 thereof. The alignment elements 134 have a generally U-shaped cross-section inverted relative to the header frame 12 for nesting of the outer and inner side walls 56, 58 of the lateral lean bar supports 38a, 38b within each respective alignment element 134, thus aiding in proper alignment of the lateral lean bar supports 38a, 38b and posts 64 relative to the mounting brackets 126. However, it is to be appreciated that the mounting brackets may have any number of potential arrangements and shapes for coupling with the lateral lean bar supports without varying the scope of the invention. A latch pin 132 is operatively engaged with each of the posts 64 to further secure the lateral lean bar supports 38a, 38b to the first and second crop pick-up reels 32, 34, as shown in FIG. 4.

Referring to FIGS. 5 and 8, the center reel bracket 106 includes an engagement surface 136 extending between a pair of downwardly-extending outer side walls 138 which terminate at a lower end 140. The engagement surface 136 slidably engages the horizontal top side 94 of the center reel support arm 26, and each of the outer side walls 138 straddle the lateral side walls 92 of the center reel support arm 26. Each of the outer side walls 138 includes an annular coupling element 139 disposed thereon for rotatably coupling with the medial ends 35b of the first and second crop pick-up reels 32, 34, as shown in FIG. 5. A reel drive assembly known in the art is operatively coupled between the center reel bracket 106 and the first and second crop pick-up reels 32, 34 for rotatably driving the first and second crop pick-up reels 32, 34 to engage and harvest the crops. One such reel drive assembly is described in U.S. Pat. No. 6,591,598, the disclosure of which is hereby incorporated by reference in its entirety. Referring to FIGS. 8 and 9, a mounting bracket 142 extends between the lower ends 140 of the side walls 138 and includes an opening 144 therethrough. The opening 144 receives the post 74 extending from the medial lean bar support 40b of the second lean bar assembly 36b and a latch pin 132 is operatively engaged with the post 74 to releasably couple the medial lean bar supports 40a, 40b to the first and second crop pick-up reels 32, 34.

Figure 10:
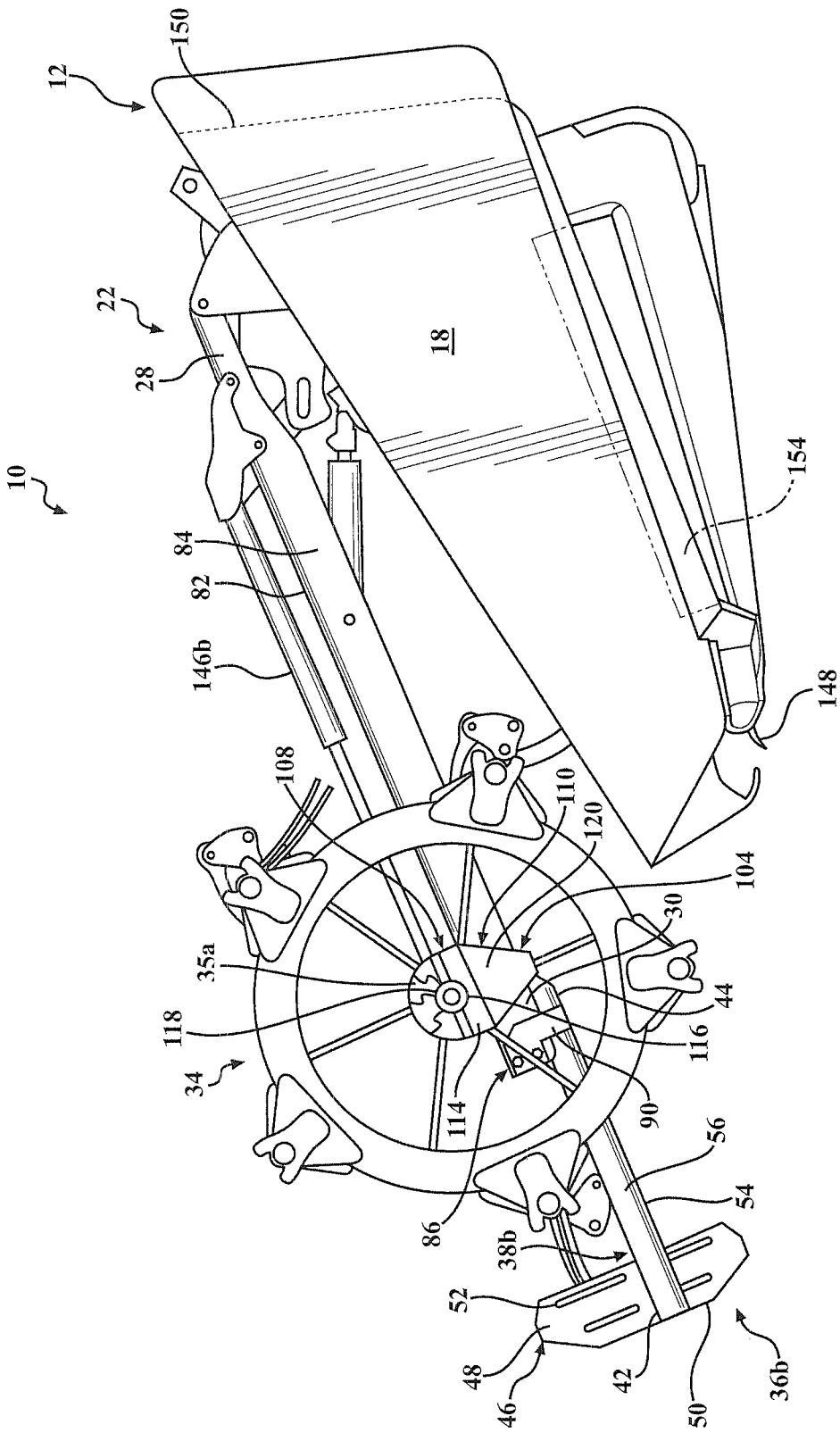
FIG. 10 is a side view of the draper header of FIG. 1 showing a hydraulic cylinder extended after moving a first and a second crop pick-up reel and the first and second lean bar assemblies in a fore direction.
Figure 11:
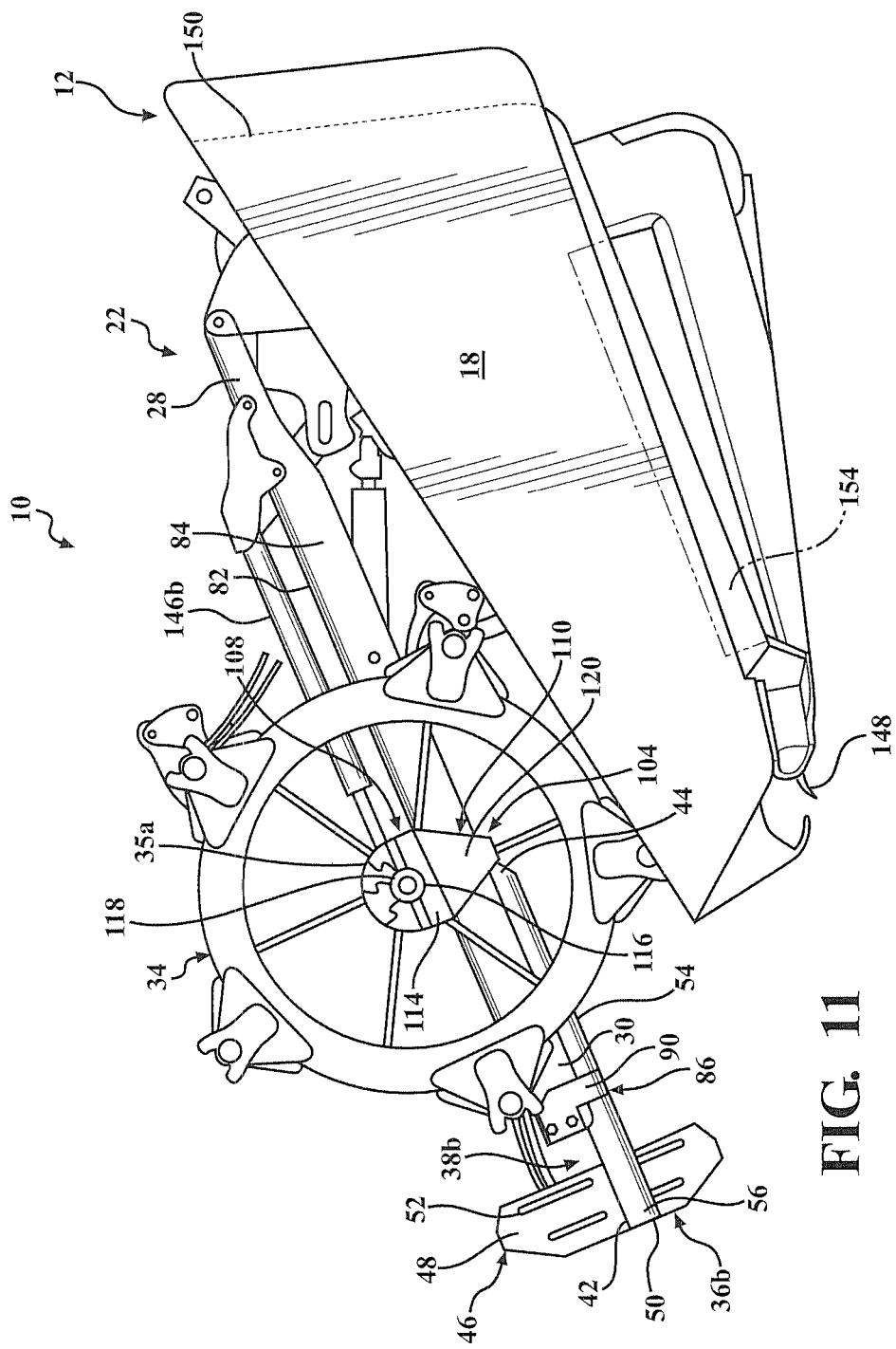
FIG. 11 is a side view of the draper header of FIG. 1 showing the hydraulic cylinder retracted after moving the first and second crop pick-up reels and the first and second lean bar assemblies in an aft direction.

Referring to FIGS. 1, 10, and 11, a first hydraulic cylinder 146a is operatively coupled between the proximal end 28 of the inboard reel support arm 22 and the upper portion 108 of the lateral reel bracket 104 disposed on the inboard reel support arm 22, and a second hydraulic cylinder 146b is operatively coupled between the proximal end 28 of the outboard reel support arm 24 and the upper portion 108 of the lateral reel bracket 104 disposed on the outboard reel support arm 24. Additionally, referring to FIGS. 1 and 6, a third hydraulic cylinder 146c is operatively coupled between the proximal end 28 of the center reel support arm 26 and the center reel bracket 106. However, it is to be appreciated that the draper header may include any suitable number and arrangement of hydraulic cylinders or may instead include a suitable alternative mechanism for providing slideable movement of the crop pick-up reels without varying the scope of the invention. The first, second, and third hydraulic cylinders 146a, 146b, 146c are simultaneously and correspondingly extendable, as shown in FIG. 10, and retractable, as shown in FIG. 11, to move the center reel bracket 106 and the lateral reel brackets 104, and therefore, the first and second crop pick-up reels 32, 34 in the fore and aft directions along the inboard, outboard, and center reel support arms 22, 24, 26 between the proximal and distal ends 28, 30 thereof. The first and second lean bar assemblies 36a, 36b, slidably supported by the lateral and center cradles 86, 98 and secured to the lateral and center reel brackets 104, 106, move with the first and second crop pick-up reels 32, 34 in the fore and aft directions to maintain the predetermined position relative to the first and second crop pick-up reels 32, 38, as shown in FIGS. 10 and 11.

Referring to FIGS. 1, 10, and 11, the draper header 10 further includes a cutter bar assembly 148 operatively extending across the front portion 14 of the header frame 12 for cutting the crops to be harvested. A rear wall 150 extends vertically from the rear portion 16 of the header frame 12 between the first and second ends 18, 20 thereof. An opening 152 extends through the rear wall 150 of the header frame 12 for transferring crops away from the draper header 10, generally for further processing by an agricultural machine such as a combine or for creation of windrows by a swather. However, it is to be appreciated that the crops may be transferred from the draper header for any number of other suitable purposes not listed herein without varying the scope of the invention. At least one tensioned draper belt assembly 154 is operatively coupled between the first and second ends 18, 20 of the header frame 12. The draper belt assembly 154 is adapted and arranged for transporting cut crops engaged by the first and second crop pick-up reels 32, 34 to the opening 152 in the rear wall 150 for transfer of the crops away from the draper header 10.

Referring to operation of the draper header 10, a user first selects the predetermined position of the first and second lean bar assemblies 36a, 36b relative to the first and second crop pick-up reels 32, 34 to optimally position the first and second lean bar assemblies 36a, 36b for the specific crops to be harvested. The predetermined position is selectable by manipulating each crop engagement element 46 in the fore and aft directions along the longitudinally extending slots 60, 72 of each respective pair of lateral and medial lean bar supports 38a, 38b, 40a, 40b. Once the predetermined position has been selected, the first, second, and third hydraulic cylinders 146a, 146b, 146c may be extended and retracted as desired, as shown in FIGS. 10 and 11, to move the first and second crop pick-up reels 32, 34 in the fore and aft directions along the inboard, outboard, and center reel support arms 22, 24, 26 for optimal reel positioning for the specific crops to be harvested. Movement of the first and second crop pick-up reels 32, 34 in the fore and aft directions simultaneously and correspondingly moves the first and second lean bar assemblies 36a. 36b in the fore and aft directions therewith while maintaining the predetermined position. The crops to be harvested first engage the first and second lean bar assemblies 36a, 36b and are therefore forwardly leaned or bent prior to entering the first and second crop pick-up reels 32, 34 to prevent tangling of crops within the first and second crop pick-up reels 32, 34. After engaging the first and second lean bar assemblies 36a, 36b, the crops engage the first and second crop pick-up reels 32, 34 and are cut by the cutter bar assembly 148. Once cut by the cutter bar assembly 148 and positioned by the first and second crop pick-up reels 32, 34, the cut crops are transported by the draper belt assembly 154 to the opening 152 in the rear wall 150 of the header frame 12 for further processing or windrow creation.

To remove the first and second lean bar assemblies 36a, 36b from the draper header 10 for storage or use of the draper header 10 without the lean bar assemblies 36a, 36b, the latch pins 132 are first disengaged from each post 64, 74 extending from the medial and lateral lean bar supports 38a, 38b, 40a, 40b, as shown in FIGS. 4, 8, and 9. The second lean bar assembly 36b is then removed first from the draper header 10. The lateral lean bar support 38b is first removed from the lateral cradle 86 coupled to the inboard reel support arm 22, and the post extending therefrom 64 is correspondingly removed from the opening 130 in the mounting bracket 126 secured to the lateral reel bracket 104, as shown in FIGS. 3 and 4. The medial lean bar support 40b is simultaneously removed from the center cradle 98 and from within the medial lean bar support 40a of the first lean bar assembly 36a. The post 74 extending from the medial lean bar support 40b of the second lean bar assembly 36b is also removed from the opening 78 disposed in the second end 44 of the medial lean bar support 40a of the first lean bar assembly 36a and the opening 144 in the mounting bracket 142 of the center reel bracket 106, as shown in FIGS. 8 and 9. Then, the first lean bar assembly 36a is subsequently removed from the draper header 10. The lateral lean bar support 38a is removed from the lateral cradle 86 coupled to the outboard reel support arm 24, and the post extending therefrom 64 is removed from the opening 130 in the mounting bracket 126 secured to the lateral reel bracket 104, as shown in FIGS. 2 and 3. The medial lean bar support 40a of the first lean bar assembly 36a is simultaneously removed through the center cradle 98, and the first and second lean bar assemblies 36a, 36b are therefore fully detached from the draper header 10. The same steps are followed in a substantially reverse order for re-attaching the first and second lean bar assemblies 36a, 36b to the draper header 10.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A draper header for harvesting agricultural crops, the draper header comprising:
    a header frame having a front and a rear portion extending laterally between opposite first and second ends;
    a first and a second reel support arm adjacent the first and second ends of the header frame, each of the first and second reel support arms extending between a proximal end coupled to the rear portion of the header frame and an opposite distal end spaced above the front portion of the header frame;
    a crop pick-up reel rotatably coupled between the first and second reel support arms for engaging the crops to be harvested, the crop pick-up reel selectively moveable in a fore and an aft direction along the reel support arms between the proximal and distal ends thereof;
    a lean bar assembly coupled to the crop pick-up reel for engaging the crops to be harvested prior to the crop pick-up reel, wherein the lean bar assembly is secured at a predetermined position relative to the crop pick-up reel to maintain the predetermined position during selective movement of the crop pick-up reel in the fore and aft directions, wherein the lean bar assembly includes a pair of spaced apart lean bar supports extending longitudinally between a first end and an opposite second end, and a crop engagement element extending laterally between the first ends of the lean bar supports; and
    a cradle coupled adjacent the distal ends on each of the first and second reel support arms for slidably receiving and supporting the lean bar supports therethrough during selective movement of the crop pick-up reel in the fore and aft directions.

2. The draper header of claim 1 further comprising a reel bracket slidably attached to each of the first and second reel support arms for rotatably supporting the crop pick-up reel therebetween and slidably supporting the crop pick-up reel for movement in the fore and aft directions between the proximal and distal ends of the first and second reel support arms.

3. The draper header of claim 2 wherein the second ends of the lean bar supports are coupled to the reel brackets for movement of the lean bar assembly in the fore and aft directions as the reel brackets slide between the proximal and distal ends of the first and second reel support arms.

4. The draper header of claim 3 wherein the second ends of the lean bar supports include a post extending longitudinally therefrom.

5. The draper header of claim 4 further comprising a mounting bracket fixedly secured to each of the reel brackets, the mounting brackets each including an opening for receiving the posts therethrough to couple the lean bar supports to the crop pick-up reel.

6. The draper header of claim 5 further comprising a latch pin operatively engaged with each of the posts to secure the lean bar supports to the crop pick-up reel.

7. The draper header of claim 6 further comprising an elongated slot adjacent the first ends of each of the lean bar supports for adjustably supporting the crop engagement element therebetween.

8. The draper header of claim 7 wherein the crop engagement element is adjustable in the fore and aft directions along the elongated slots for selecting the predetermined position relative to the crop pick-up reel.

9. The draper header of claim 8 further comprising a cutter bar assembly operatively extending across the front portion of the header frame for cutting the crops to be harvested.

10. The draper header of claim 9 further comprising a rear wall extending vertically from the rear portion of the header frame between the first and second ends thereof, the rear wall including an opening therethrough for transferring cut crops from the draper header.

11. The draper header of claim 10 further comprising at least one draper belt assembly operatively coupled between the first and second ends of the header frame, the draper belt assembly adapted and arranged for transporting cut crops to the opening in the rear wall.

12. The draper header of claim 11 further comprising a reel positioning mechanism operatively coupled between the crop pick-up reel and at least one of the first and the second reel support arms for movement of the crop pick-up reel in the fore and aft directions along the reel support arms between the proximal and distal ends thereof.

13. The draper header of claim 12 wherein the reel positioning mechanism is a hydraulic cylinder operatively coupled between at least one of the reel brackets and at least one of the first and the second reel support arms adjacent the proximal end thereof, the hydraulic cylinder extendable and retractable to move the crop pick-up reel in the fore and aft directions along the reel support arms between the proximal and distal ends thereof.

14. A draper header for harvesting agricultural crops, the draper header comprising:
    a header frame having a front and a rear portion extending laterally between opposite first and second ends;
    an inboard and an outboard reel support arm adjacent the first and second ends of the header frame and a center reel support arm spaced therebetween, each of the inboard, outboard, and center reel support arms extending between a proximal end coupled to the rear portion of the header frame and an opposite distal end spaced above the front portion of the header frame;
    a first crop pick-up reel rotatably coupled between the outboard and center reel support arms and a second crop pick-up reel rotatably coupled between the inboard and center reel support arms for engaging the crops to be harvested, the first and second crop pick-up reels selectively moveable in a fore and an aft direction along the inboard, outboard, and center reel support arms between the proximal and distal ends thereof;
    a lean bar assembly coupled to each of the first and second crop pick-up reels for engaging the crops to be harvested prior to the first and second crop pick-up reels, wherein at least one of the lean bar assemblies is secured at a predetermined position relative to the first and second crop pick-up reels to maintain the predetermined position during selective movement of the first and second crop pick-up reels in the fore and aft directions, wherein the lean bar assemblies each include a pair of spaced apart lateral and medial lean bar supports extending longitudinally between a first end and an opposite second end, and a crop engagement element extending laterally between the first ends of each pair of lateral and medial lean bar supports, wherein the medial lean bar support of one of the lean bar assemblies is slidably and matingly coupled to the medial lean bar support of the other of the lean bar assemblies.

15. The draper header of claim 14 further comprising a cradle coupled adjacent the distal ends on each of the inboard, outboard, and center reel support arms for slidably receiving and supporting the lateral and medial lean bar supports therethrough during selective movement of the first and second crop pick-up reels in the fore and aft directions.

16. The draper header of claim 15 further comprising a reel bracket slidably attached to each of the inboard, outboard, and center reel support arms for rotatably supporting the first and second crop pick-up reels therebetween and slidably supporting the first and second crop pick-up reels for movement in the fore and aft directions between the proximal and distal ends of the inboard, outboard, and center reel support arms.

17. The draper header of claim 16 wherein the reel bracket slidably attached to the center reel support arm is adapted for operatively coupling to both the first and second crop pick-up reels for corresponding movement thereof in the fore and aft directions between the proximal and distal ends of the center reel support arm.

18. The draper header of claim 17 wherein the second ends of the lateral and medial lean bar supports are coupled to the reel brackets for movement of the lean bar assemblies in the fore and aft directions as the reel brackets slide between the proximal and distal ends of the inboard, outboard, and center reel support arms.

19. The draper header of claim 18 wherein the second end of one of the lateral lean bar supports is coupled to the reel bracket slidably attached to the outboard reel support arm, the second end of the other of the lateral lean bar supports is coupled to the reel bracket slidably attached to the inboard reel support arm, and the medial lean bar supports are coupled to the reel bracket slidably attached to the center reel support arm.

20. The draper header of claim 19 wherein the second ends of the lateral lean bar supports each include a lateral support post extending longitudinally therefrom.

21. The draper header of claim 20 wherein one of the medial lean bar supports includes a medial support post extending longitudinally therefrom, and the other of the medial lean bar supports includes an opening for receiving the medial support post to couple the medial lean bar supports.

22. The draper header of claim 21 further comprising a mounting bracket fixedly secured to each of the reel brackets, the mounting brackets each including an opening for receiving the lateral and medial support posts therethrough to couple the lateral and medial lean bar supports to the first and second crop pick-up reels.

23. The draper header of claim 22 further comprising a latch pin operatively engaged with each of the lateral and medial support posts to secure the lateral and medial lean bar supports to the first and second crop pick-up reels.

24. The draper header of claim 23 further comprising an elongated slot adjacent the first ends of the lateral and medial lean bar supports for adjustably supporting the crop engagement elements therebetween.

25. The draper header of claim 24 wherein the crop engagement elements of each lean bar assembly are adjustable in the fore and aft directions along the elongated slots for selecting the predetermined position relative to the first and second crop pick-up reels.

26. The draper header of claim 25 wherein the crop engagement elements each have a pair of lateral side walls and a substantially arcuate forward wall 50 extending therebetween.

27. The draper header of claim 26 wherein each medial lean bar support has a substantially J-shaped cross-section at the first ends thereof and a substantially U-shaped cross-section at the second ends thereof.

28. The draper header of claim 27 wherein the cross-section of one of the medial lean bar supports is mirrored relative to the other of the medial lean bar supports.

29. The draper header of claim 28 further comprising a reel drive mechanism operatively coupled to the first and second crop pick-up reels for rotatably driving the first and second crop pick-up reels to engage and harvest the crops.

30. The draper header of claim 29 further comprising a cutter bar assembly operatively extending across the front portion of the header frame for cutting the crops to be harvested.

31. The draper header of claim 30 further comprising a rear wall extending vertically from the rear portion of the header frame between the first and second ends thereof, the rear wall including an opening therethrough for transferring cut crops from the draper header.

32. The draper header of claim 31 further comprising at least one draper belt assembly operatively coupled between the first and second ends of the header frame, the draper belt assembly adapted and arranged for transporting cut crops to the opening in the rear wall.

33. The draper header of claim 32 further comprising a reel positioning mechanism operatively coupled between at least one of the first and second crop pick-up reels and at least one of the inboard, outboard, and center reel support arms for movement of the first and second crop pick-up reels in the fore and aft directions along the inboard, outboard, and center reel support arms between the proximal and distal ends thereof.

34. The draper header of claim 33 wherein the reel positioning mechanism is a hydraulic cylinder operatively coupled between at least one of the reel brackets and at least one of the inboard, outboard, and center reel support arms adjacent the proximal end thereof, the hydraulic cylinder extendable and retractable to move the first and second crop pick-up reels in the fore and aft directions along the inboard, outboard, and center reel support arms between the proximal and distal ends thereof.

* * * * *